United States Patent
Ishizu

(10) Patent No.: US 10,873,690 B2
(45) Date of Patent: Dec. 22, 2020

(54) COMMUNICATION APPARATUS, METHOD FOR CONTROLLING THE COMMUNICATION APPARATUS AND COMPUTER READABLE STORAGE MEDIUM

(71) Applicant: CANON KABUSHIKI KAISHA, Tokyo (JP)

(72) Inventor: Akihiko Ishizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/229,014

(22) Filed: Dec. 21, 2018

(65) Prior Publication Data
US 2019/0199910 A1    Jun. 27, 2019

(30) Foreign Application Priority Data
Dec. 26, 2017    (JP) .................... 2017-250105

(51) Int. Cl.
*H04N 5/232*    (2006.01)
*H04N 7/18*    (2006.01)
(Continued)

(52) U.S. Cl.
CPC ........... *H04N 5/23206* (2013.01); *H04N 1/00* (2013.01); *H04N 1/21* (2013.01); *H04N 5/232* (2013.01);
(Continued)

(58) Field of Classification Search
CPC ........ H04N 5/23206; H04N 1/21; H04N 1/00; H04N 5/232; H04N 7/188; H04N 5/23241;
(Continued)

(56) References Cited

U.S. PATENT DOCUMENTS

| | | | | |
|---|---|---|---|---|
| 2002/0158970 A1* | 10/2002 | Takeshi | .............. | H04N 1/00127 348/211.3 |
| 2003/0103144 A1* | 6/2003 | Sesek | ................. | H04N 1/00209 348/207.1 |
| 2012/0200718 A1* | 8/2012 | Tokunaga | .......... | H04N 1/00925 348/207.1 |

(Continued)

FOREIGN PATENT DOCUMENTS

| | | |
|---|---|---|
| CN | 1874492 A | 12/2006 |
| CN | 101094287 A | 12/2007 |

(Continued)

OTHER PUBLICATIONS

The above patent documents were cited in a European Search Report dated May 16, 2019, which is enclosed, that issued in the corresponding European Patent Application No. 18209742.8.

(Continued)

*Primary Examiner* — Yogesh K Aggarwal
(74) *Attorney, Agent, or Firm* — Cowan, Liebowitz & Latman, P.C.

(57) ABSTRACT

A communication apparatus which includes a communication unit that communicates with an external apparatus, records connection information for connecting to the external apparatus using the communication unit, and subjects, upon activation of the communication apparatus, the communication unit to communication connection to the external apparatus based on the connection information. The communication apparatus inhibits the communication connection to the external apparatus based on an activation factor, which is a factor in the activation of the communication apparatus.

22 Claims, 9 Drawing Sheets

(51) Int. Cl.
*H04N 1/21* (2006.01)
*H04N 1/00* (2006.01)

(52) U.S. Cl.
CPC ..... *H04N 5/23225* (2013.01); *H04N 5/23241* (2013.01); *H04N 7/188* (2013.01)

(58) Field of Classification Search
CPC ........ H04N 5/23225; H04N 5/76; H04N 7/18; H04L 67/141; H04L 67/143; H04W 4/80; H04W 76/10; H04W 76/18
See application file for complete search history.

(56) References Cited

U.S. PATENT DOCUMENTS

| | | | |
|---|---|---|---|
| 2013/0214157 A1* | 8/2013 | Kitano | A61B 6/4283 250/336.1 |
| 2013/0344812 A1* | 12/2013 | Dees | H04L 63/18 455/41.2 |

FOREIGN PATENT DOCUMENTS

| | | |
|---|---|---|
| CN | 102629974 A | 8/2012 |
| CN | 103259952 A | 8/2013 |
| CN | 103685726 A | 3/2014 |
| CN | 106973216 A | 7/2017 |
| EP | 1650959 A2 | 4/2006 |
| JP | 2007-020039 A | 1/2007 |
| JP | 2014-131184 A | 7/2014 |

OTHER PUBLICATIONS

The above foreign patent documents were cited in a Jun. 3, 2020 Chinese Office Action, which is enclosed with an English Translation, that issued in Chinese Patent Application No. 201811589362.3.

* cited by examiner

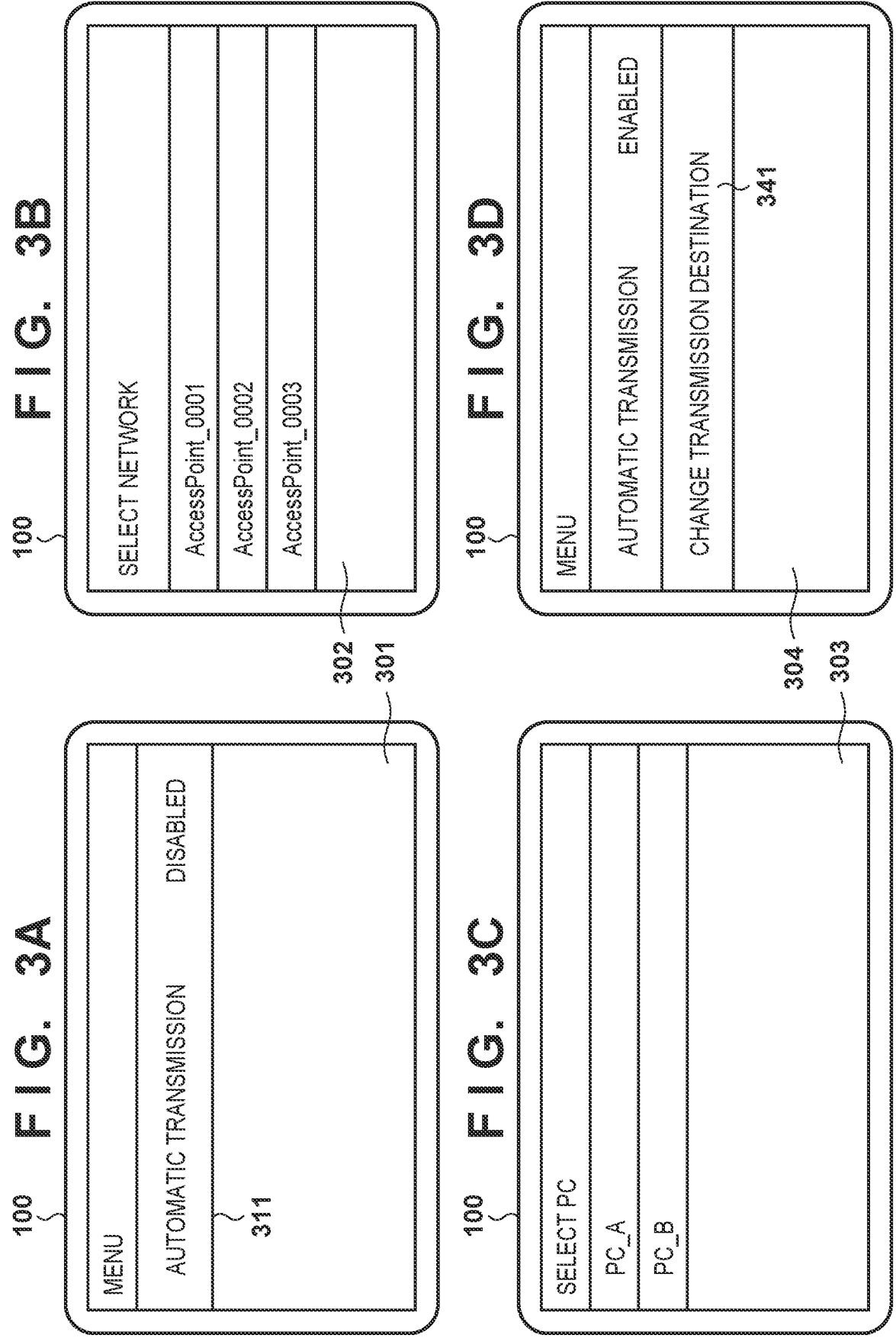

COMMUNICATION APPARATUS, METHOD FOR CONTROLLING THE COMMUNICATION APPARATUS AND COMPUTER READABLE STORAGE MEDIUM

BACKGROUND OF THE INVENTION

Field of the Invention

The present invention relates to a communication apparatus capable of communicating with an external apparatus via a network, a method for controlling the communication apparatus and a computer readable storage medium.

Description of the Related Art

In recent years, image capturing apparatuses such as digital cameras have been provided with a communication apparatus that has the wireless communication function of accessing a network via an access point. For example, Japanese Patent Laid-Open No. 2014-131184 discloses an image capturing apparatus configured to upload an image to a server on a network via an access point. Furthermore, recently, a memory card like Eye-Fi (registered trademark) has been proposed that enables, by registering information relating to an external apparatus to be subjected to communication connection in advance, automatic image transmission to an external apparatus when an electric current is caused to flow through the memory card.

However, according to the above-described conventional technique, the image capturing apparatus always automatically transmits an image upon being activated. Accordingly, even when automatic transmission is not necessarily needed, image transmission is started. For example, in interval shooting, in which activation, shooting, and shut-down are repeated at set regular intervals, the image capturing apparatus will be shortly shut down even if transmission processing is started. In interval shooting, a user does not intend to transmit an image to an external apparatus and an image may not be completely transmitted. If, under such conditions, the image capturing apparatus establishes, upon being activated, a wireless communication connection with an external apparatus and starts transmitting an image, the electric power will be unnecessarily consumed.

SUMMARY OF THE INVENTION

One embodiment of the present invention provides a communication apparatus that suppresses unnecessary data transmission and reduces electric power consumption, and a method for controlling the same.

According to one aspect of the present invention, there is provided a communication apparatus comprising: a communication unit configured to communicate with an external apparatus; a recording unit configured to record connection information for connecting to the external apparatus using the communication unit; a connecting unit configured to subject, upon activation of the communication apparatus, the communication unit to communication connection to the external apparatus based on the connection information; and an inhibiting unit configured to inhibit the communication connection to the external apparatus established by the connecting unit, based on an activation factor, which is a factor in the activation of the communication apparatus.

According to another aspect of the present invention, there is provided a method for controlling a communication apparatus that includes a communication unit configured to communicate with an external apparatus, the method comprising: recording connection information for connecting to the external apparatus using the communication unit; connecting, upon activation of the communication apparatus, the communication unit to the external apparatus based on the connection information so that the communication unit and the external apparatus are subjected to communication connection; and inhibiting the communication connection to the external apparatus established in the connecting, based on an activation factor, which is a factor in the activation of the communication apparatus.

According to another aspect of the present invention, there is provided a communication apparatus comprising: an image capture unit; a communication unit configured to communicate with an external apparatus; a recording unit configured to record image data obtained by the image capture unit; and a control unit configured to establish, upon activation of the communication apparatus, communication connection to the external apparatus registered in advance, and controlling the communication unit so that the image data recorded by the recording unit is automatically transmitted to the external apparatus, wherein the control unit controls the communication unit so that automatic transmission of the image data is not executed if a factor in the activation of the communication apparatus is a predetermined factor.

According to another aspect of the present invention, there is provided a method for controlling a communication apparatus that includes an image capture unit, a communication unit configured to communicate with an external apparatus, and a recording unit configured to record image data obtained by the image capture unit, the method comprising: establishing, upon activation of the communication apparatus, communication connection to the external apparatus registered in advance, and controlling the communication unit so that the image data recorded by the recording unit is automatically transmitted to the external apparatus; and controlling the communication unit so that automatic transmission of the image data is not executed if a factor in the activation of the communication apparatus is a predetermined factor.

According to another aspect of the present invention, there is provided a non-transitory computer readable storage medium storing a program for causing a computer to perform a method for controlling a communication apparatus that includes a communication unit configured to communicate with an external apparatus, the method comprising: recording connection information for connecting to the external apparatus using the communication unit; connecting, upon activation of the communication apparatus, the communication unit to the external apparatus based on the connection information so that the communication unit and the external apparatus are subjected to communication connection; and inhibiting the communication connection to the external apparatus established in the connecting, based on an activation factor, which is a factor in the activation of the communication apparatus.

According to another aspect of the present invention, there is provided a non-transitory computer readable storage medium storing a program for causing a computer to perform a method for controlling a communication apparatus that includes image capture unit, a communication unit configured do communicate with an external apparatus, and a recording unit configured to record image data obtained by the image capture unit, the method comprising: establishing, upon activation of the communication apparatus, communication connection to the external apparatus registered in advance, and controlling the communication unit so that the image data recorded by the recording unit s automatically transmitted to the external apparatus; and controlling the communication unit so that automatic transmission of the image data is not executed if a factor in the activation of the communication apparatus is a predetermined factor.

Further features of the present invention will become apparent from the following description of exemplary embodiments with reference to the attached drawings.

BRIEF DESCRIPTION OF THE DRAWINGS

FIGS. 3A to 3D are diagrams illustrating examples of UIs provided by the digital camera according to the embodiment.

FIGS. 5A-1 and 5A-2 are flowcharts illustrating processing for transmitting an image captured by the digital camera according to the embodiment.

DESCRIPTION OF THE EMBODIMENTS

Hereinafter, embodiments of the present invention will be described in detail with reference to the accompanying drawings. Note that the following embodiments will describe an example of means for implementing the present invention, and may be corrected or modified appropriately according to the configurations of the apparatus to which the present invention is applied or various conditions. Furthermore, the embodiments may also be combined as appropriate.

Internal Configuration of Digital Camera 100

Figure 1:
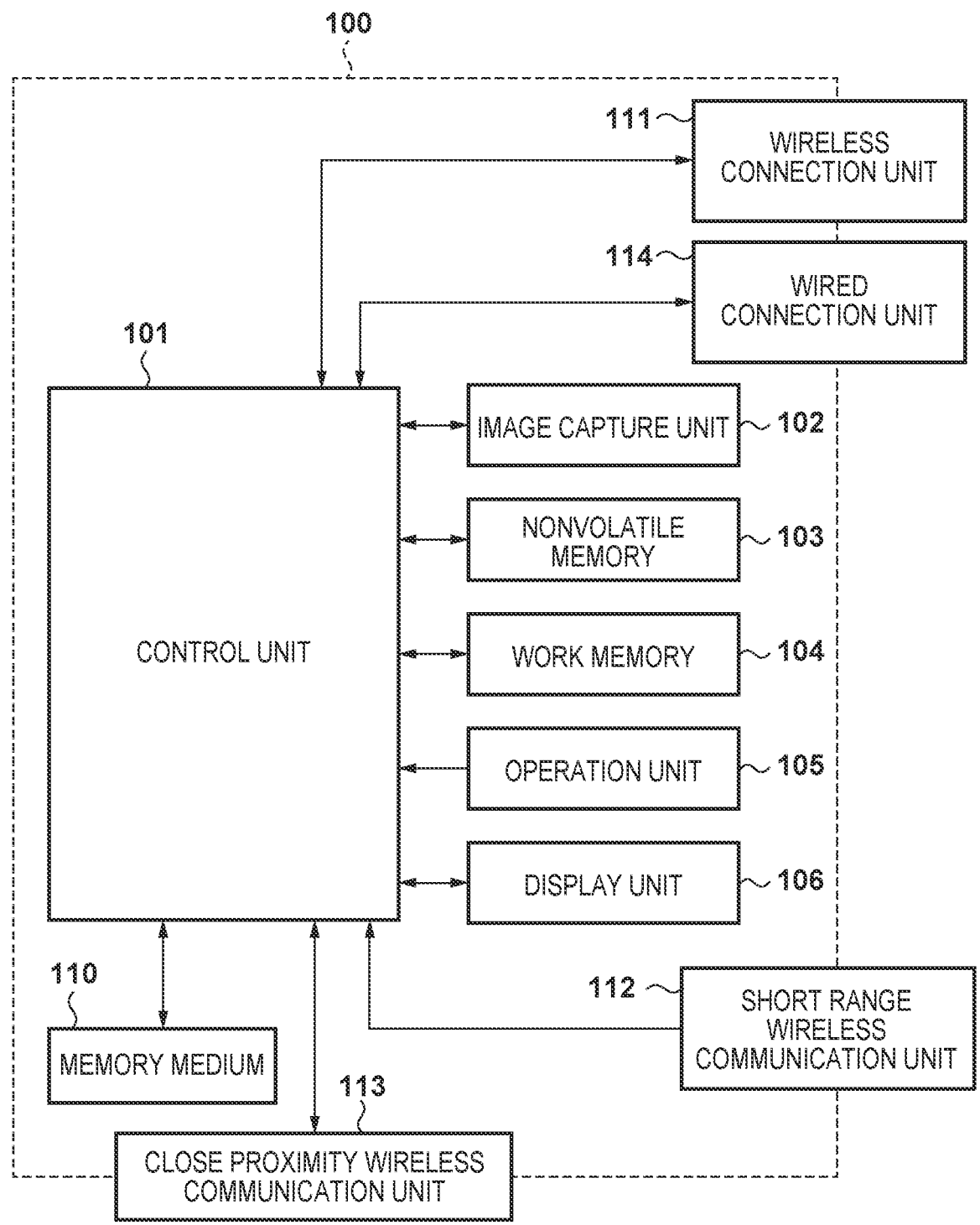
FIG. 1 is a block diagram illustrating an example of a configuration of a digital camera according to an embodiment.

FIG. 1 is a block diagram illustrating an example of a configuration of a digital camera 100, which serves as an example of a communication apparatus of the present embodiment. Note here that a digital camera will be described as an example of the communication apparatus, but the communication apparatus is not limited to this. For example, the communication apparatus may also be an information processing apparatus such as a mobile media player, a so-called tablet device, or a personal computer. Also, in the following, a moving image is to be automatically transmitted by the communication apparatus, hut the present invention is not limited to this.

A control unit 101 controls constituent components of the digital camera 100 based on an input signal or a program. The program is stored in a nonvolatile memory 103, for example. Note that, instead of the control unit 101 performing overall control of the apparatus, a plurality of pieces of hardware may share processing to perform overall or partial control of the apparatus.

An image capture unit 102 includes, for example: an optical lens unit; an optical system for controlling a diaphragm, zooming, and focusing for example; an image sensor for converting light (video) incident via the optical lens unit into an electric video signal; and the like. As the image sensor, a CMOS (Complementary Metal Oxide Semiconductor) or a CCD (Charge Coupled Device) is ordinarily used. The image capture unit 102 is controlled by the control unit 101 to convert light of a subject image formed by the optical lens unit into an electric signal using the image sensor, subject the converted signal to noise reduction processing or the like, and output digital data as image data. In the digital camera 100 of the present embodiment, image data is recorded in a memory medium 110 in compliance with the DCF (Design Rule for Camera File system) standard.

The nonvolatile memory 103 is an electrically erasable and recordable nonvolatile memory, and stores programs and the like that are executed in the control unit 101, A work memory 104 is used as a buffer memory for temporarily storing image data captured by the image capture unit 102, an image display memory for a display unit 106, a work area for the control unit 101, or the like.

An operation unit 105 is used to accept a user instruction for the digital camera 100 from a user. The operation unit 105 includes, for example, a power button used by the user to give instructions to turn the digital camera 100 ON/OFF, a release switch used to give an instruction for shooting, and a reproduction button used to give an instruction for image data reproduction. The operation unit 105 further includes an operation member such as a dedicated connection button for starting communication with an external apparatus via a wireless connection unit 111, A touch panel formed on the display unit 106 is also included in the operation unit 105.

Note that the release switch includes an SW 1 and an SW 2. The SW 1 is turned ON if the release switch enters a so-called halfway pressed state. Accordingly, the control unit 101 starts shooting preparation such as AF (autofocus) processing, AE (automatic exposure) processing, AWB (automatic white balance) processing, and EF (flash pre-emission) processing. Furthermore, the SW 2 is turned ON if the release switch enters a so-called fully pressed state. Accordingly, the control unit 101 starts a shooting operation.

The display unit 106 displays a view finder image when performing shooting, displays image data obtained by shooting, and displays characters for a dialog operation, for example. Note that the digital camera 100 does not necessarily need to include the display unit 106. It is sufficient for the digital camera 100 to be able to connect to an internal or external display unit 106, and at least have the display control function of controlling display of the display unit 106. The memory medium 110 can record image data obtained through shooting performed by the image capture unit 102. The memory medium 110 may be detachably provided on the digital camera 100, or may be built into the digital camera 100. In other words, it is sufficient for the digital camera 100 to have at least a means for accessing the memory medium 110.

The wireless connection unit 111 and a wired connection unit 114 are interfaces for connecting to an external apparatus. The digital camera 100 of the present embodiment can exchange data with an external apparatus via the wireless connection unit 111 or the wired connection unit 114. For example, data of an image captured by the image capture unit 102 can be transmitted to an external apparatus via the wireless connection unit 111 or the wired connection unit 114. Note that, in the present embodiment, the wireless connection unit 111 includes an interface for communicating with an external apparatus via a so-called wireless LAN in compliance with the IEEE802.11 standard. The control unit 101 controls the wireless connection unit 111 to realize wireless communication with an external apparatus. Note that the communication method is not limited to the wireless LAN, and examples of the communication method include an infrared communication method. Furthermore, the wired connection unit 114 performs communication in compliance with, for example, the USB standard.

A short range wireless communication unit 112 is provided with, for example, an antenna for wireless communication, a modulation/demodulation circuit for processing a wireless signal, and a communication controller. The digital camera 100 according to the present embodiment can exchange data with an external apparatus via the short range wireless communication unit 112. For example, upon receiving a shooting instruction from an external apparatus via the short range wireless communication unit 112, the control unit 101 controls the image capture unit 102 to perform a shooting operation. Furthermore, upon receiving an instruction for transmitting and receiving data through wireless LAN communication from an external apparatus via the short range wireless communication unit 112, the control unit 101 controls the wireless connection unit 111 to start wireless LAN communication. Note that the short range wireless communication unit 112 according to the present embodiment can accept communication with an external apparatus even when the control unit 101 is in an OFF or sleep state. Accordingly, if the digital camera 100 receives, during the so-called sleep state, an instruction for transmitting and receiving data through wireless LAN communication from an external apparatus via the short range wireless communication unit 112, the short range wireless communication unit 112 will transmit and receive information required for activating the control unit 101 and information required for wireless LAN communication. Then, the control unit 101 uses the information required for wireless LAN communication to perform so-called handover processing for establishing wireless LAN communication with the external apparatus.

The short range wireless communication unit 112 realizes short range wireless communication in compliance with the IEEE802.15 standard (so-called Bluetooth (registered trademark)), by outputting a modulated wireless signal from the antenna and demodulating a wireless signal received by the antenna. In the present embodiment, the version 4.0 of Bluetooth (registered trademark) Low Energy, which consumes little electric power is employed as Bluetooth (registered trademark) communication. Bluetooth (registered trademark) communication has a smaller range in which communication is possible (communicable range) than wireless LAN communication (in other words, the communicable distance is small). Furthermore, Bluetooth (registered trademark) communication has a slower communication speed than wireless LAN communication. On the other hand, Bluetooth (registered trademark) communication consumes less electric power than wireless LAN communication.

A close proximity wireless communication unit 113 is provided with, for example, an antenna for wireless communication, a modulation/demodulation circuit for processing a wireless signal, and a communication controller. The close proximity wireless communication unit 113 realizes contactless close proximity communication in compliance with the ISO/IEC 18092 standard (so-called NFC: Near Field Communication), by outputting a modulated wireless signal from the antenna and demodulating a wireless signal received by the antenna. The close proximity wireless communication unit 113 of the present embodiment is disposed on, for example, a side portion of the digital camera 100.

By bringing the close proximity wireless communication unit 113 of the digital camera 100 into close proximity with a close proximity wireless communication unit of an external apparatus, close proximity wireless communication with the external apparatus is started, and the digital camera 100 is connected to the external apparatus. Note that, when close proximity wireless communication units are used to realize connection, the close proximity wireless communication units of these apparatuses do not necessarily need to come into contact with each other. Close proximity wireless communication units can perform communication even if they are apart from each other by a certain distance, and thus it is sufficient to bring these apparatuses close to each other a range in which close proximity wireless communication is possible, in order to realize connection between the apparatuses. In the following description, the expression "bring . . . close to each other in a range in which close proximity wireless communication is possible" is referred to also as "bring . . . into close proximity".

Also, communication is not started unless the close proximity wireless communication units of these apparatuses are in a range in which close proximity wireless communication is possible. Also, if, from a state in which the close proximity wireless communication units of digital cameras 100 are present in the range in which close proximity wireless communication is possible, and the digital cameras 100 are subjected to communication connection, the close proximity wireless communication units are moved away from each other and are no longer present in the range in which close proximity wireless communication is possible, the communication connection will be cancelled. Note that the contactless close proximity communication realized by the close proximity wireless communication unit 113 is not limited to NFC, and may be another type of wireless communication. For example, contactless close proximity communication in compliance with the ISO/IEC 14443 standard may also be employed as the contactless close proximity communication realized by the close proximity wireless communication unit 113.

In the present embodiment, the communication speed of communication realized by the wireless connection unit 111 is higher than the communication speed of communication realized by the close proximity wireless communication unit 113. Furthermore, communication realized by the wireless connection unit 111 has a communicable range that is larger than that of communication realized by the close proximity wireless communication unit 113. However, communication realized by the close proximity wireless communication unit 113 can limit the number of communication counterparts due to its smaller communicable range, and thus does not require processing that is required in communication realized by the wireless connection unit 111, such as encryption key exchange processing. That is, easier communication is possible using the close proximity wireless communication unit 113 than using the wireless connection unit 111. Note that the close proximity wireless communication unit 113 of the present embodiment, similar to the above-described short range wireless communication unit 112, can also accept communication with an external apparatus even when the control unit 101 is in the OFF or sleep state. Accordingly, by bringing an external apparatus into close proximity with the camera 100 when it is in the OFF or sleep state, a user can perform handover processing from close proximity wireless communication to a wireless LAN.

Note that the wireless connection unit 111 of the digital camera 100 according to the present embodiment has an AP mode, in which it operates as an access point in an infrastructure mode, and a CL mode, in which it operates as a client in the infrastructure mode. Due to the wireless connection unit 111 operating in the CL mode, the digital camera 100 according to the present embodiment can operate as a CL device in the infrastructure mode. When the digital camera 100 operates as a CL device, the digital camera 100 can connect to an adjacent AP device to join a network formed by the AP device.

Furthermore, due to the wireless connection unit 111 operating in the AP mode, the digital camera 100 according to the present embodiment can operate as a simpler functionally-limited AP (hereinafter, referred to as "simple AP"), which is a type of AR When the digital camera 100 operates as a simple AP, the digital camera 100 forms a network by itself. A device in the vicinity of the digital camera 100 recognizes the digital camera 100 as an AP device, and can join the network formed by the digital camera 100.

Note that, although the digital camera 100 according to the present embodiment is a type of AP, it is a simple AP that does not have the gateway function of forwarding data received from a CL device to an internet provider or the like. Accordingly, even if the digital camera 100 receives data from another device that has joined the network formed by the digital camera 100, the digital camera 100 will not be able to forward the data to a network such as the Internet. Thus, the description of the digital camera 100 according to the present embodiment has been given.

Internal Configuration of PC 200

The following will describe an information processing apparatus capable of operating as an external apparatus that acquires data from a communication apparatus (digital camera 100) as described above through wireless communication. In the following description, a case where such an information processing apparatus is a personal computer (hereinafter, referred to as "PC 200") is taken as an example.

Figure 2:
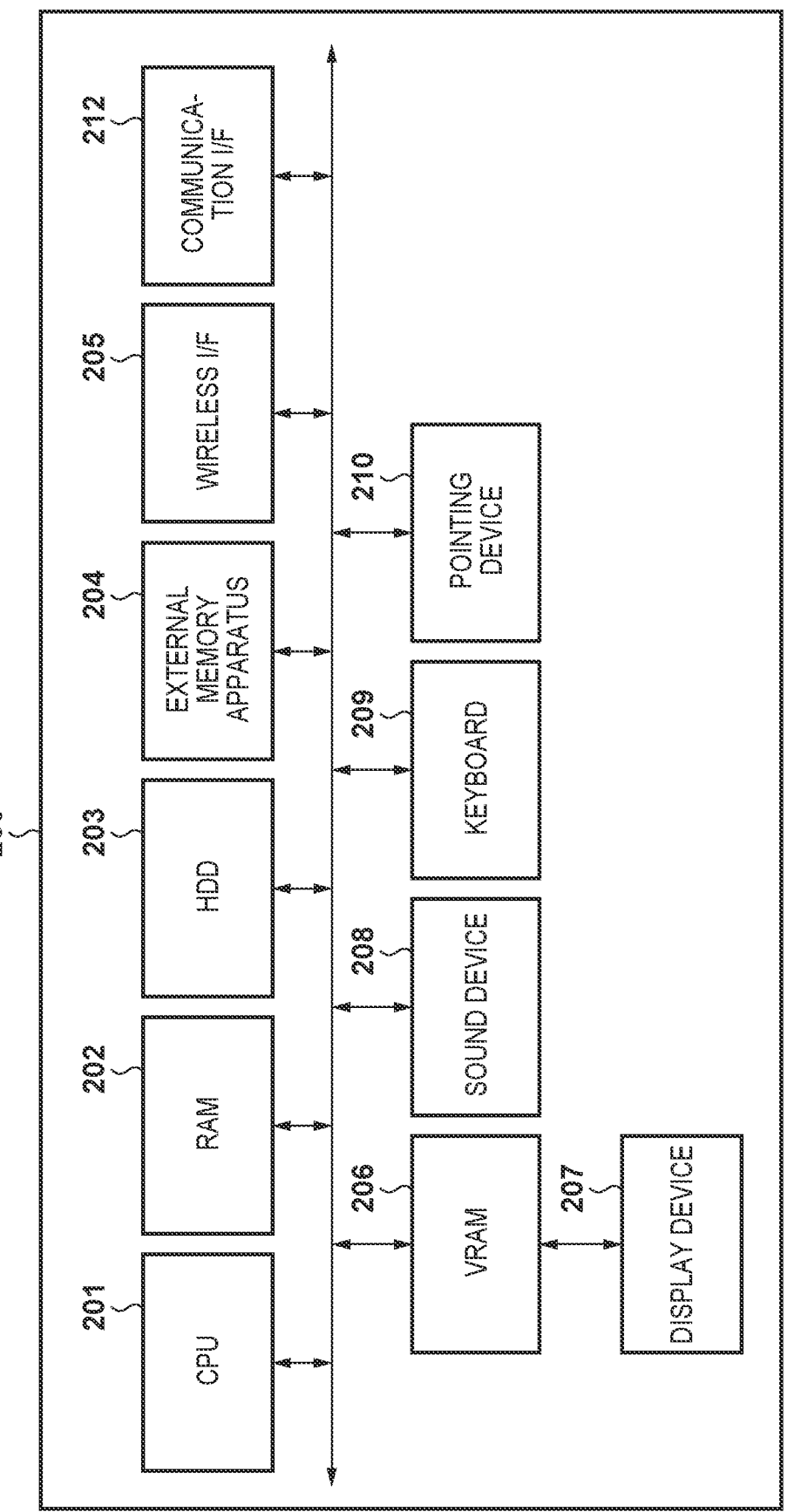
FIG. 2 is a block diagram illustrating an example of a configuration of a PC according to the embodiment.

FIG. 2 is a block diagram illustrating a configuration of the PC 200 according to the present embodiment. The PC 200 includes a CPU 201, a RAM 202, an HDD 203, an external memory apparatus 204, a wireless communication interface 205, a VRAM 206, and a display device 207. The PC 200 further includes a sound device 208, a keyboard 209, a pointing device 210, and a wired communication interface 212.

The CPU 201 realizes, based on an input signal or a program, display control, recording control, and communication control of the information processing apparatus, for example. In the RAM 202, a program and image data are expanded. The program refers to a program code for controlling image display or image processing, and is executed by the CPU 201. Furthermore, the RAM 202 is used as a work area for the CPU 201, a data saving area during error processing, or the like. The HDD 203 stores control programs executed in the information processing apparatus, content files such as an image file and a text file, and the like.

The external memory apparatus 204 is a device for performing reading and writing with respect to a detachable external memory medium. If a program and image data are recorded in the external memory medium, they are loaded to the RAM 202 via the external memory apparatus 204. Examples of the external memory medium include optical disks such as a DVD-RW drive, a CD-ROM, a CD-R, and a DVD-AM, a flexible disk, a magnetic disk such as an MO, and a nonvolatile memory such as a flash memory.

The VRAM 206 outputs image data or a video signal of an UI of a running program. The display device 207 executes processing for displaying the video signal input to the VRAM 206. For example, a CRT or an LCD may be used as the display device 207. Alternatively, an SED (Surface-conduction Electron-emitter Display) or an EL (Electro Luminescent) may be used. The sound device 208 processes sound data attached to, for example, image data and forwards the processed sound data to a loudspeaker or the like. The keyboard 209 includes various types of keys for inputting characters and the like. The pointing device 210 is used to control a pointer displayed on the display screen of the display device 207, and operate a menu or other objects of a program. Examples of the pointing device 210 include a mouse.

The wireless communication interface 205 is an interface for performing communication with an external apparatus. Through this device, the PC 200 can perform communication with an external apparatus (for example, the digital camera 100). The wireless communication interface 205 can perform communication with an external apparatus through a so-called wireless LAN in compliance with the IEEE802.11 standard. The wired communication interface 212 is an interface that complies with the USB standard for example, and is used to communicate with the digital camera 100 via the wired connection unit 114 of the digital camera 100. In the present embodiment, for example, the USB is used as the wired communication interface 212. Note that the wireless communication interface 205 and the wired communication interface 212 are not limited to those in compliance with the above-described standards. Furthermore, the PIP (Picture Transfer Protocol) standard may serve as an example of a protocol for communicating with the digital camera 100 in a higher level.

The PC 200 is capable of transmitting and receiving data to and from an external apparatus using these communication interfaces. In the present embodiment, as a result of a program recorded in the HDD 203 being loaded to the RAM 202 and being executed by the CPU 201, the PC 200 functions as a communication apparatus. Note that, in the present embodiment, the wireless communication interface 205 and the wired communication interface 212 are described as separate devices, but, for example, the PC 200 may include a single chip that functions as both interfaces.

Forwarding Processing

The digital camera 100 of the present embodiment can perform two types of transmission, namely, manual transmission processing and automatic transmission processing. Manual transmission processing is a method in which, after wireless LAN communication with the PC 200 has been established, a user selects an image on, for example, a GUI of the digital camera 100 or the PC 200 and gives a transmission instruction to transmit the image. Note that there are various methods for establishing wireless LAN communication, but if the above-described handover processing is used to establish the communication, an image will be transmitted manually. On the other hand, automatic transmission processing is a method in which, upon being turned on, the digital camera 100 automatically joins an adjacent wireless LAN network, establishes communication with the PC 200 registered as a transmission destination, and transmits an image thereto. Accordingly, when the user turns on the digital camera 100 at a timing, for example at which he or she comes home, image data is automatically backed up to the home PC. This processing will be described in detail later.

Registration of Transmission Destination for Images of Digital Camera 100

The digital camera 100 and the PC 200 regularly detect a beacon signal transmitted by an access point, and join a wireless LAN network formed by this access point. After having joined the same wireless LAN network, the digital camera 100 and the PC 200 find each other, obtain each other's capabilities, and then enter a state in which data transmission/reception through a wireless LAN is possible (communication between the devices is established).

FIGS. 3A to 3D are diagrams showing examples of UIs of the digital camera 100 when the digital camera 100 registers the PC 200 as a transmission destination. FIG. 3E is a flowchart showing registration processing for registering a transmission destination for automatic transmission processing that is performed by the digital camera 100. Hereinafter, a sequence when the digital camera 100 registers the PC 200 as an image transmission destination will be described with reference to FIGS. 3A to 3E.

Figure 3E:
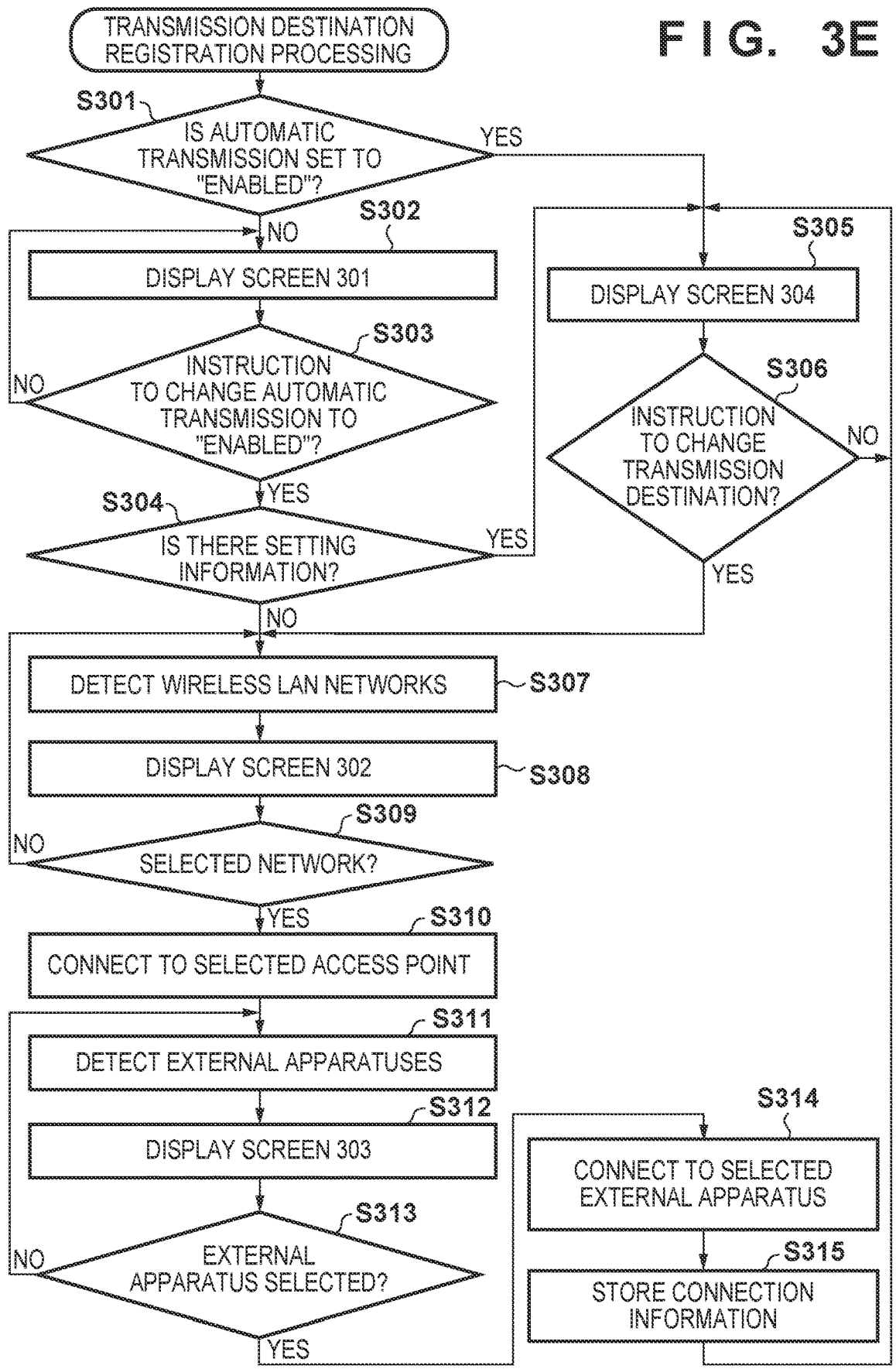
FIG. 3E is a flowchart illustrating processing for registering transmission destinations that is performed by a digital camera 100.

First, when a user instructs the digital camera 100 to execute transmission destination registration, the processing shown in FIG. 3E is activated. First, in step S301, the control unit 101 determines whether or not automatic transmission is set to "enabled". If it is determined by the control unit 101 that automatic transmission is not set to "enabled" (No in step S301), the procedure moves to step S302. On the other hand, if it is determined by the control unit 101 that automatic transmission is set to "enabled" (Yes in step S301), the procedure moves to step S305.

In step S302, the control unit 101 performs control such that the display unit 106 displays a screen 301 including an automatic transmission menu 311, as shown in FIG. 3A. The screen 301 in FIG. 34 indicates that automatic image transmission is set to "disabled". The setting can be changed to a state in which automatic image transmission is "enabled", in accordance with an operation of the operation unit 105. When, in step S303, the control unit 101 recognizes that the user has changed the setting for automatic transmission from "disabled" to "enabled", the control unit 101 determines, in step S304, whether or not an image transmission destination for automatic transmission has already been registered. It is possible to determine whether or not a transmission destination has been registered, by determining whether or not there is setting information for automatic transmission. If it is determined in step S304 that there is setting information (a transmission destination has been registered), the procedure moves to step S305. Furthermore, if it is determined in step S304 that there is no setting information (no transmission destination has been registered), the procedure moves to step S307.

In step S305, the control unit 101 performs control such that a screen 304 shown in FIG. 3D is displayed. The screen 304 indicates a state in which automatic transmission is set to "enabled", and displays a menu button 341 for giving an instruction to change the transmission destination. If the menu button 341 is selected as per an operation made by the user on the operation unit 105, the procedure moves from step S306 (YES) to step S307.

From steps S307 onward, processing for registering a transmission destination is performed. First, in step S307, the control unit 101 detects wireless LAN networks, and displays, in step S308, a list of the detected wireless LAN networks as shown in a screen 302 in FIG. 313. By detecting beacon signals at access points, the digital camera 100 displays the wireless LAN networks of the detected access points. If a wireless LAN network is selected from the list in the screen 302 by a user operation performed on the operation unit 105 (YES in step S309), the procedure moves to step S310.

In step S310, the control unit 101 connects to the access point that forms the selected wireless LAN network, and joins the wireless LAN network. After having joined the wireless LAN network, the control unit 101 makes, in step S311, a device search request requesting the wireless LAN network to detect an external apparatus. In step S312, the control unit 101 displays, as shown in a screen 303 in FIG. 3C, a list of external apparatuses that have transmitted a search response to the device search request. Here, a search response includes an identifier for uniquely identifying an external apparatus that has responded.

When an external apparatus is selected as a transmission destination from the list of external apparatuses by a user operation performed on the operation unit 105 (YES in step S313), the control unit 101 makes, in step S314, a connection request to the selected external apparatus, and establishes a connection thereto. After the establishment of the connection, thus, the control unit 101 stores, in step S315, information relating to this connection (including information for identifying the access point and information for identifying the external apparatus) as setting information for automatic transmission. For example, in a case where the external apparatus serving as an automatic transmission destination is the PC 200, an identifier for uniquely identifying the PC 200 and information for connecting to the access point of the joined wireless LAN network (such as, for example, an SSID and a password) are stored in the nonvolatile memory 103. The identifier of the PC 200 is used to specify the PC 200 when performing automatic image transmission.

Note that if, in step S310, connection to the access point has failed, the control unit 101 performs control such that this fact is displayed and returns to the procedure in step S307. Furthermore, if, in step S314, connection to the external apparatus has failed, the control unit 101 returns the procedure in step S311. After the control unit 101 has stored the setting information in step S315, the procedure moves to step S305. As described above, in step S305, the control unit 101 displays, as shown in the screen 304 in FIG. 3D, the automatic transmission menu indicating that automatic transmission is set to "enabled".

Image Transmission

Figure 4:
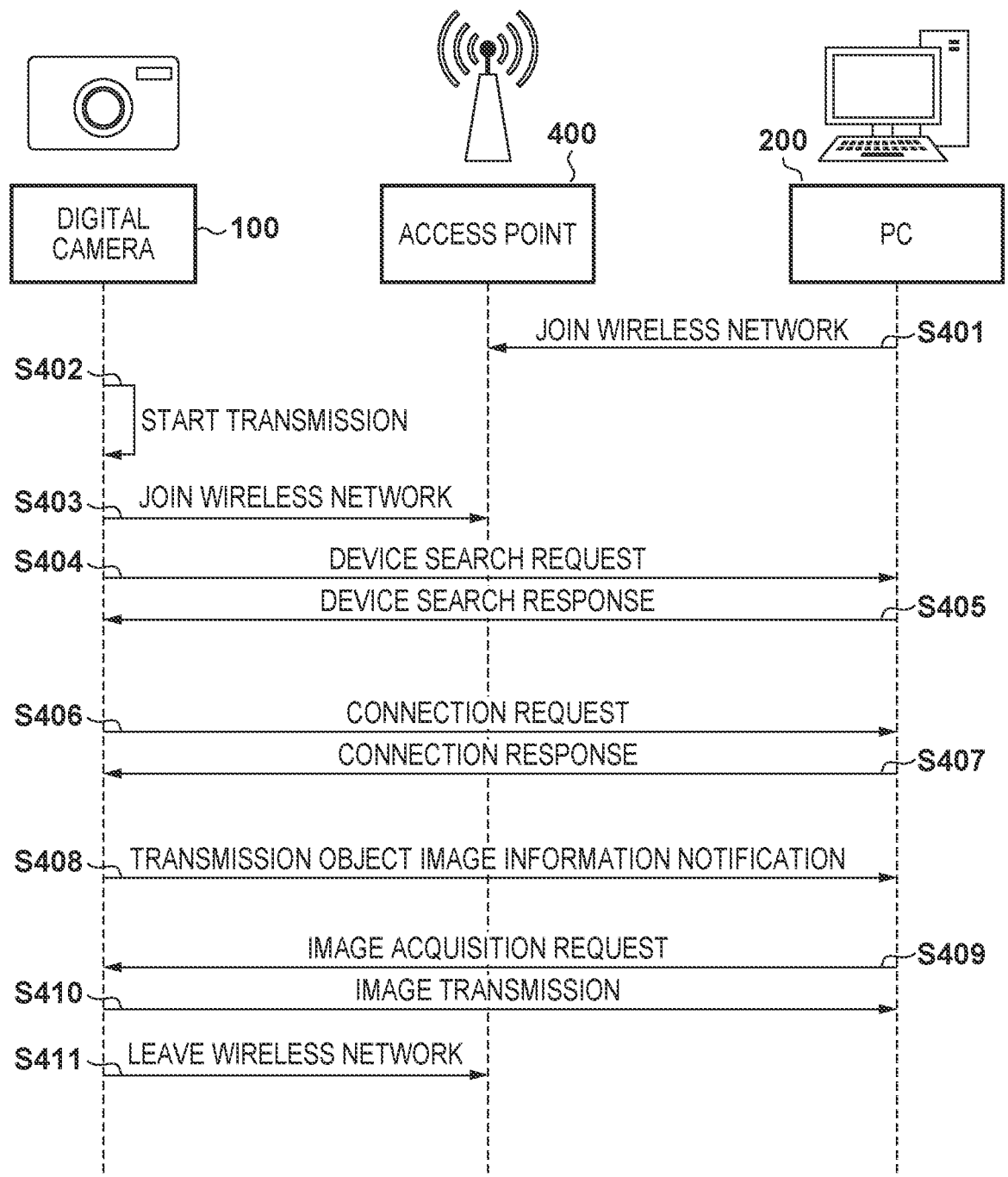
FIG. 4 is a sequence diagram illustrating an operation for transmitting an image to the PC from the digital camera.

The following will describe, with reference to FIG. 4, operations of the digital camera 100 and the PC 200 when the digital camera 100 automatically transmits an image to the PC 200. FIG. 4 is a sequence diagram showing the operations in which the digital camera 100 automatically transmits an image to the PC 200.

First, in step S401, the PC 200 joins a wireless LAN network of an access point. The digital camera 100 determines, upon being activated, whether or not to start automatic transmission in step S402. This determination is based on, for example, an activation factor of the digital camera 100 (details thereof will be described later) or whether or not the memory medium 110 contains an image that has not yet been transmitted (un-transmitted) and is to be transmitted. If it is determined that automatic transmission is to be started, the digital camera 100 joins, in step S403, the wireless LAN network of the access point based on the setting information stored in the nonvolatile memory 103 when an image transmission destination was registered (step S315).

Note that, in the present embodiment, in step S401, the PC 200 first joined the wireless LAN network, but the present invention is not limited to this. For example, steps S401, S402, and S403 may be performed in a different order, for example, in the order of S402, S403, and S401, and it is sufficient that the digital camera 100 and the PC 200 join the same wireless LAN network.

In step S404, the digital camera 100 makes a device search request via the wireless LAN network joined in step S403. In step S405, the digital camera 100 determines whether or not the identifier of the external apparatus that has given a device search response matches the identifier of the external apparatus in the setting information stored in the nonvolatile memory 103. If it is determined that the identifier of the external apparatus that has given the device search response matches the identifier of the external apparatus in the setting information stored in the nonvolatile memory 103, the digital camera 100 makes a connection request to the external apparatus (PC 200) in step S406. As a result of the PC 200 giving a connection response in step S407, a communication connection between the digital camera 100 and the PC 200 is established.

In step S408, the digital camera 100 references transmission history information recorded in the memory medium 110, and notifies the PC 200 of information such as a file path of an image that has not yet been transmitted to the PC 200, from among images recorded in the memory medium 110. The PC 200 makes, in step S409, an acquisition request for acquiring an image of the notified file path. In step S410, the digital camera 100 transmits the image to the PC 200 in response to the acquisition request. Upon completion of the transmission of the requested image, the digital camera 100 updates a file that manages the transmission history information so that this image is indicated as "transmitted".

The series of processing from steps S408 to S410 are repeated up until transmission of all of the images is completed. If all of the images have been transmitted, the digital camera 100 leaves, in step S411, the wireless LAN network of the access point, that is, disconnects the communication connection made by the wireless connection unit 111 and ends the processing. In this way, the images are transmitted from the digital camera 100 to the PC 200. Note that, in the present embodiment, the transmission history information is recorded as a file in the memory medium 110, but the present invention is not limited to this. For example, metadata of each image may include information indicating whether or not the image has been transmitted.

Hereinafter, the operation of the digital camera 100 when it transmits an image to the PC 200 as described with reference to FIG. 4 will be described in further detail with reference to the flowcharts of FIGS. 5A-1 to 5C.

Figures 1, 5A:
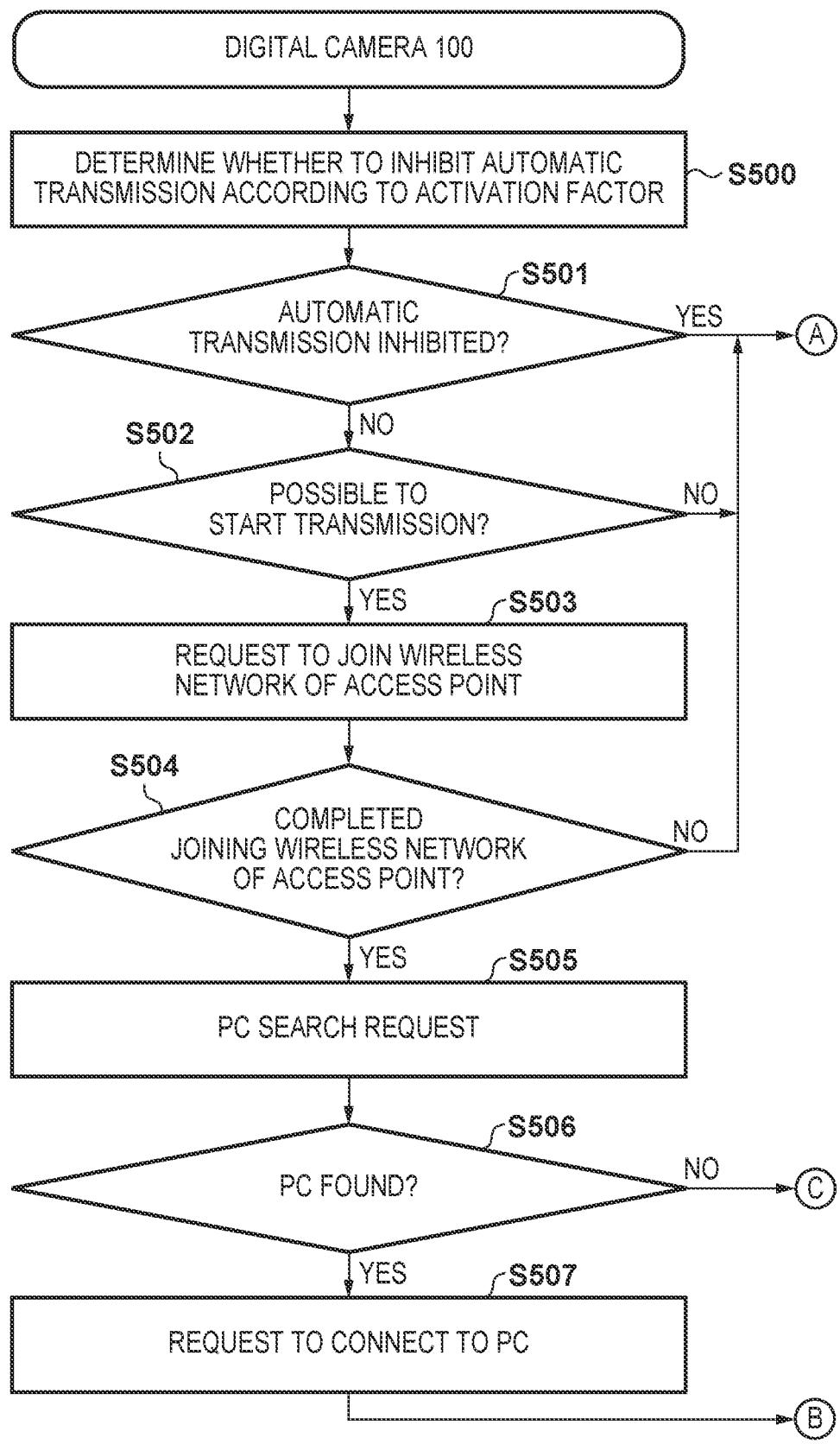
Figures 2, 5A:
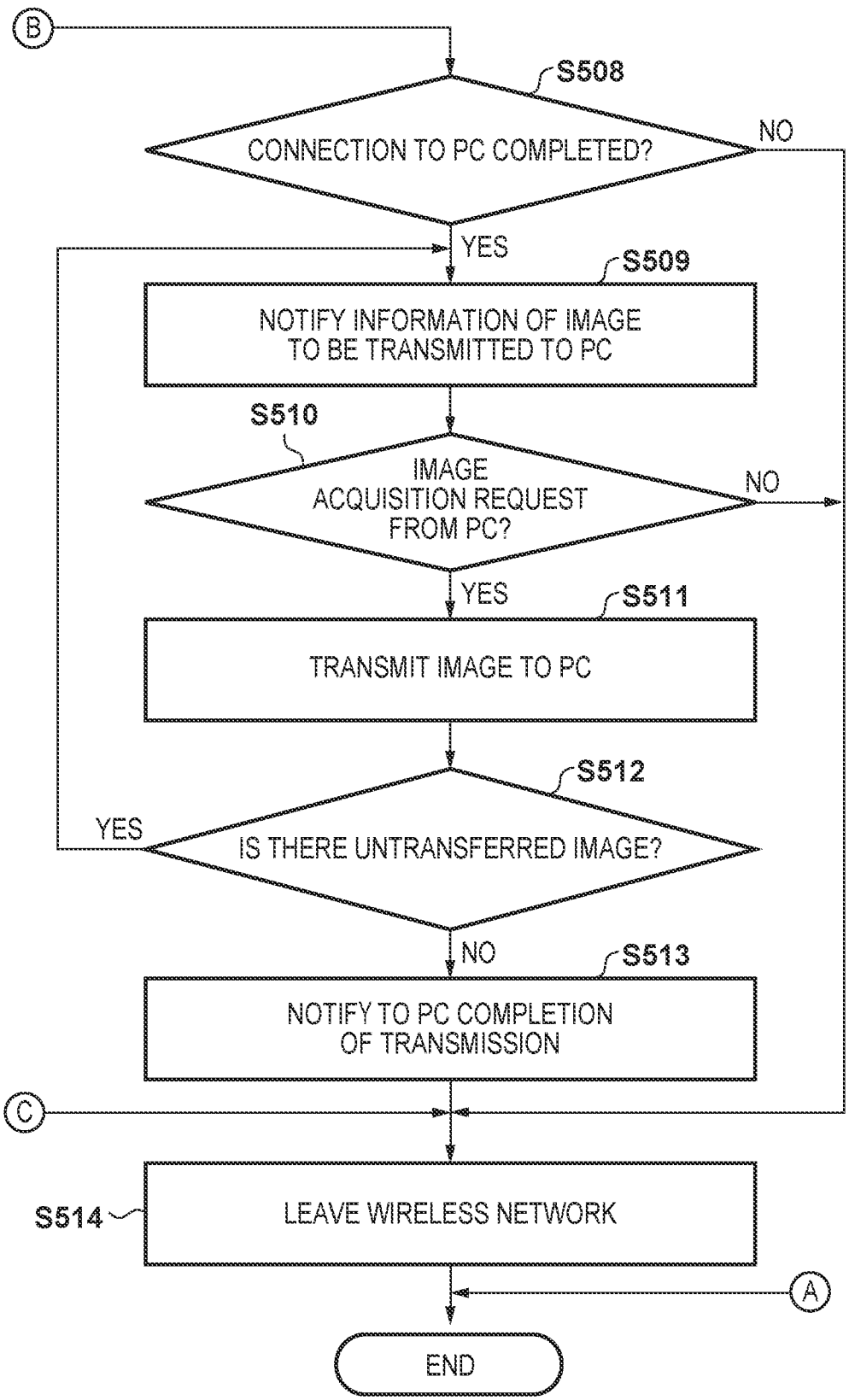

FIGS. 5A-1 and 5A-2 are flowcharts showing the operation of the digital camera when it transmits an image to the PC according to the embodiment of the present proposal. This flowchart starts when the digital camera 100 is turned on and activated, and the control unit 101 reads a program for operating the digital camera 100 from the nonvolatile memory 103 and starts processing thereof.

Figure 5B:
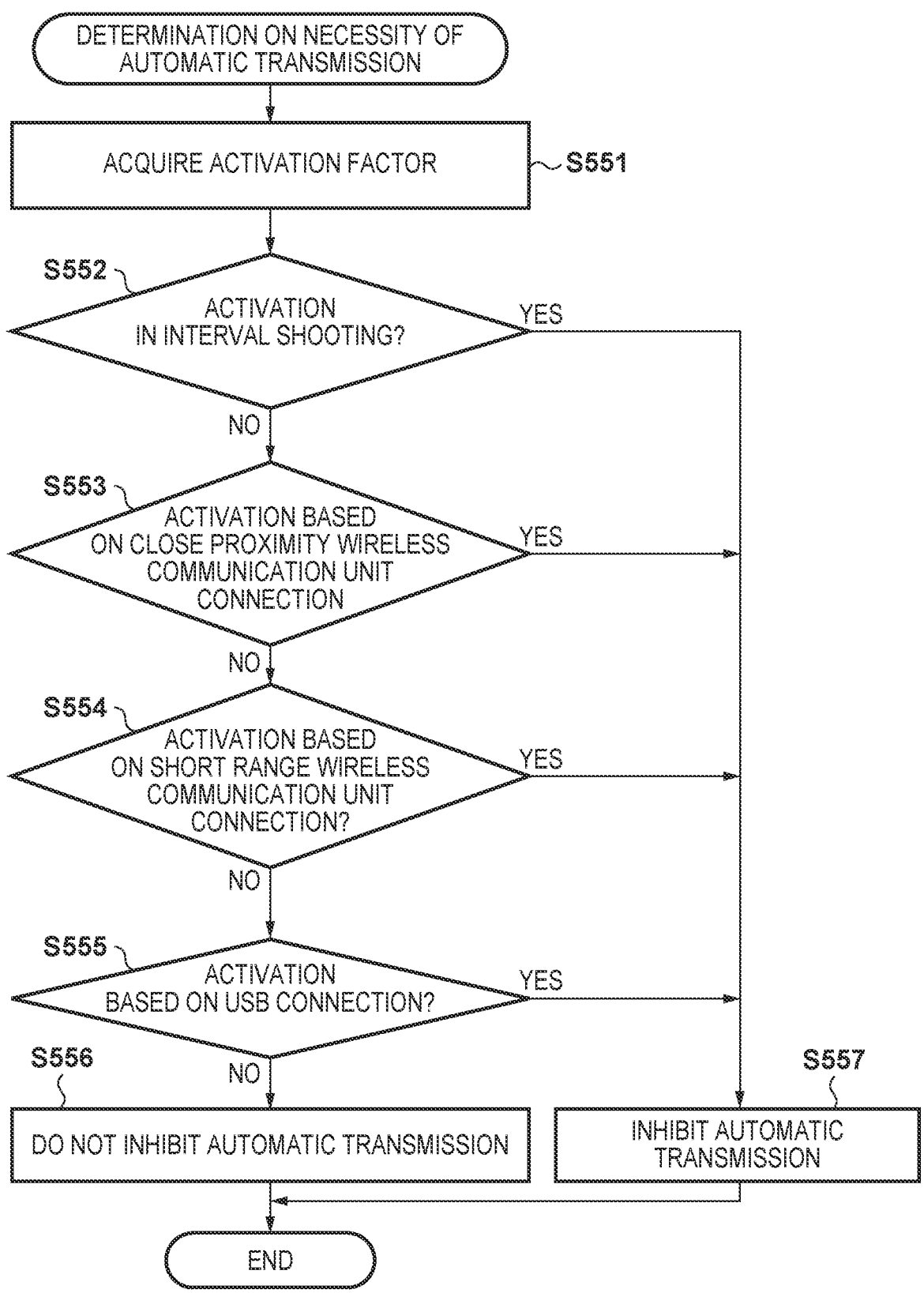
FIG. 5B is a flowchart illustrating processing for determining whether or not automatic transmission by the digital camera is required.

First, in step S500, the control unit 101 determines whether or not the present factor in the activation of the digital camera 100 is an activation factor of inhibiting automatic transmission. FIG. 5B is a flowchart showing processing for determining, based on an activation factor, whether or not to inhibit automatic transmission. In step S551, the control unit 101 acquires an activation factor. Then, in steps S552 to S555 below, the control unit 101 determines, based on the acquired activation factor, whether or not to inhibit automatic transmission.

First, the control unit 101 determines that automatic transmission does not need to be started if the digital camera 100 is activated by a function such as interval shooting in which, after activation, the digital camera 100 performs a certain processing and then shuts down. Accordingly, in step S552, the control unit 101 determines whether or not the activation factor of the digital camera 100 relates to activation in interval shooting. If it is determined that the activation factor relates to activation in interval shooting (YES in step S552), the control unit 101 decides, in step S557, to inhibit automatic transmission. Note that the interval shooting is an example, and the control unit 101 decides to inhibit automatic transmission if the digital camera 100 is activated as part of the operation in a predetermined operation mode in which automatic transmission may not be needed.

Furthermore, the control unit 101 determines that automatic transmission does not need to be performed if the digital camera 100 is activated by an external apparatus via the short range wireless communication unit 112 or the close proximity wireless communication unit 113, because it is highly likely that handover processing will be performed thereafter and a user will perform manual transmission. Accordingly, first, in step S553, the control unit 101 determines whether or not the digital camera 100 is activated in response to a connection to the close proximity wireless communication unit 113. If it is determined that the digital camera 100 is activated in response to a connection to the close proximity wireless communication unit 113 (YES in step S553), the control unit 101 decides, in step S557, to inhibit automatic transmission. For example, if the digital camera 100 is activated in response to a connection between the external apparatus and the NFC, automatic transmission will be inhibited.

Similarly, in step S554, the control unit 101 determines whether or not the digital camera 100 is activated in response to connecting to an external apparatus via the short range wireless communication unit 112. If it is determined that the digital camera 100 is activated in response to a connection of an external apparatus via the close proximity wireless communication unit 113 (YES in step S554), the control unit 101 inhibits automatic transmission in step S557. For example, if the digital camera 100 is activated in response to a connection of an external apparatus via the BLE, automatic transmission will be inhibited.

Furthermore, the control unit 101 decides that, if the digital camera 100 is activated due to a function that is mutually exclusive to the function of connecting to a wireless LAN network, automatic transmission does not need to be performed. Examples of such a state include a state in which the digital camera 100 is activated using the USB (wired connection unit 114) to connect to an external apparatus. Accordingly, in the present embodiment, in step S555, the control unit 101 determines whether or not the activation factor of the digital camera 100 relates to a USB connection. If it is determined that the activation factor relates to a USB connection (YES in step S555), the control unit 101 inhibits automatic transmission in step S557.

If it is determined that the activation factor does not correspond to any of the determination items in steps S552 to S555, the control unit 101 decides, in step S556, not to inhibit automatic transmission based on the activation factor. Note that all of the determination items exemplified in steps S552 to S555 do not need to be used, and determination items other than the above-described determination items may also be used.

Returning to FIG. 5A-1, if it is determined in step S501 that automatic transmission was inhibited in step S500 (YES in step S501), the control unit 101 ends the procedure. If it is determined that automatic transmission was not inhibited in step S500 (NO in step S501), the control unit 101 advances to step S502.

In step S502, the control unit 101 determines whether or not automatic transmission is possible. If it is determined that automatic transmission is impossible (NO in step S502), the present procedure is ended. For example, in the present embodiment, the control unit 101 checks whether or not there is an image that has not yet been transmitted and is to be subjected to automatic transmission, and determines that automatic transmission is impossible if all of the images subjected to automatic transmission have been transmitted. More specifically, the control unit 101 stores transmission history information regarding an image subjected to automatic transmission as a file in the memory medium 110. The control unit 101 reads the file of the transmission history information recorded in the memory medium 110 to the work memory 104. The control unit 101 references the transmission history information, and ends the procedure without starting automatic transmission if all of the images have been transmitted to the PC 200, which is a transmission destination of automatic transmission. Note that, in the present embodiment, transmission history information is written into a file, and thus if the memory medium 110 is in a write inhibit state, it is not possible to update the file. Accordingly, the control unit 101 also ends the procedure without starting automatic transmission while the memory medium 110 is in the write inhibit state. Note that the same does not apply if transmission history information is stored in, instead of the memory medium 110, another storage area such as the nonvolatile memory 103.

If it is determined, in step S502, that automatic transmission is possible, the procedure moves to step S503. In step S503, the control unit 101 makes, via the wireless connection unit 111, a request for joining the wireless LAN network of the access point recorded in the nonvolatile memory 103 in the above-described transmission destination registration. In step S504, the control unit 101 determines whether or not joining the wireless LAN network was successful. If joining the wireless LAN network was not successful due to reasons such as no access point being in a communicable range, or authentication for joining the wireless LAN network failing (NO in step S504), the control unit 101 ends this procedure. If it is determined by the control unit 101 that joining the wireless LAN network was successful (YES in step S504), the procedure moves to step S505.

In step S505, the control unit 101 makes, via the wireless connection unit 111, a device search request for searching for an external apparatus registered in the setting information. In the present embodiment, the control unit 101 makes a device search request for searching for the PC 200 to the wireless LAN network. In step S506, the control unit 101 determines whether or not the external apparatus of the transmission destination for automatic transmission has been found. In other words, when the control unit 101 receives a device search response via the wireless connection unit 111, the control unit 101 determines whether or not the identifier of the device search response matches the identifier recorded in the nonvolatile memory 103 through the registration of a transmission destination for automatic transmission (identifier of the PC 200 in the present embodiment). If it is determined that the identifiers match each other, the procedure moves to step S507. On the other hand, if a device search response whose identifier matches the identifier of the PC 200 is not received within a predetermined time period from the issuance of the device search request, the procedure moves to step S514. In step S514, the control unit 101 controls the digital camera 100 to leave the wireless network joined in step S503.

Note that, in the present embodiment, the procedure is ended within a predetermined time period in this way because, if a device search continues while the PC 200 is not activated or has not joined the wireless LAN network, electric power will be unnecessarily consumed, but the present invention is not limited to this. For example, if the electric power supply has a sufficient capacity, such as a case where electric power is supplied externally, a device search may also be continued.

In step S507, the control unit 101 makes, via the wireless connection unit 111, a connection request to the PC 200, and establishes a connection upon receiving a connection response from the PC 200 via the wireless connection unit 111. If the control unit 101 does not receive a connection response from the PC 200 within a predetermined time period, the control unit 101 determines that the PC 200 is in a state in which communication is impossible in step S508), and the procedure moves to step S514. Note that, although, in the present embodiment, the processing ends within a predetermined time period, the processing does not necessarily feed to end within a predetermined time period, as with the above-described search for the PC 200.

Upon completion of the connection to the PC 200 (YES in step S508), the control unit 101 reads, in step S509, the transmission history information recorded in the memory medium 110 to the work memory 104, generates information relating to an image that has not yet been transmitted to the PC 200, and notifies the PC 200 of the information via the wireless connection unit 111. If, in step S510, the control unit 101 receives, via the wireless connection unit 111, an image acquisition request from the PC 200, the procedure moves to step S511. If no image acquisition request is received within a predetermined time period, the control unit 101 determines that the PC 200 is in a state in which communication is impossible, and the procedure moves to step S514. Note that, although, in the present embodiment, the processing ends within a predetermined time period, the processing does not necessarily need to end within a predetermined time period, as with the above-described search for the PC 200.

In step S511, the control unit 101 transmits the image to the PC 200 via the wireless connection unit 111. Upon completion of the image transmission, the control unit 101 records the image as "transmitted image" in the file that manages the transmission history information recorded in the memory medium 110. In step S512, the control unit 101 reads the transmission history information recorded in the memory medium 110 to the work memory 104, and determines whether or not there is an image that has not yet been transmitted to the PC 200, If it is determined in step S512 that there is an image that has not yet been transmitted (YES in step S512), the procedure moves to step S509, whereas if it is determined that all of the images have been transmitted (NO in step S512), the procedure moves to step S513.

By repeating the procedure from steps S509 to S512 in this way, all of the images to be transmitted are transmitted to the PC 200. Note that, although, in the present embodiment, the procedure from steps S509 to S512 is repeated for each image, the present invention is not necessarily limited to this. For example, a configuration is also possible in which, in step S509, the control unit 101 notifies the PC 200 of a list of images that have not yet been transmitted to the PC 200, and repeats steps S510 and S511 so as to transmit all of the images registered in the list.

Furthermore, the digital camera 100 can perform shooting operation during the procedure from steps S509 to S512, and an image added by the shooting will serve as an image to be transmitted. Furthermore, in the present embodiment, since image transmission is automatically performed without an instruction from a user, the control unit 101 may control the display unit 106 to display an icon to notify a user that the image is being transmitted, so that the user can recognize that image transmission is underway. Note that it is sufficient that a user can recognize that image transmission is underway, and the notification that image transmission is underway is not limited to the icon display and may also be expressed using, for example, an LED (Light Emitting Diode) or the like. On the other hand, a configuration is also possible in which image transmission is automatically performed without an instruction from a user, but if the user does not want to be aware of the image transmission, the above-described display can be set to disabled.

In step S513, the control unit 101 notifies the PC 200, via the wireless connection unit 111, that transmission of all of the images is complete. Then, in step S514, the control unit 101 leaves the wireless LAN network, that is, disconnects the communication connection to the PC 200, and ends this procedure.

Figure 5C:
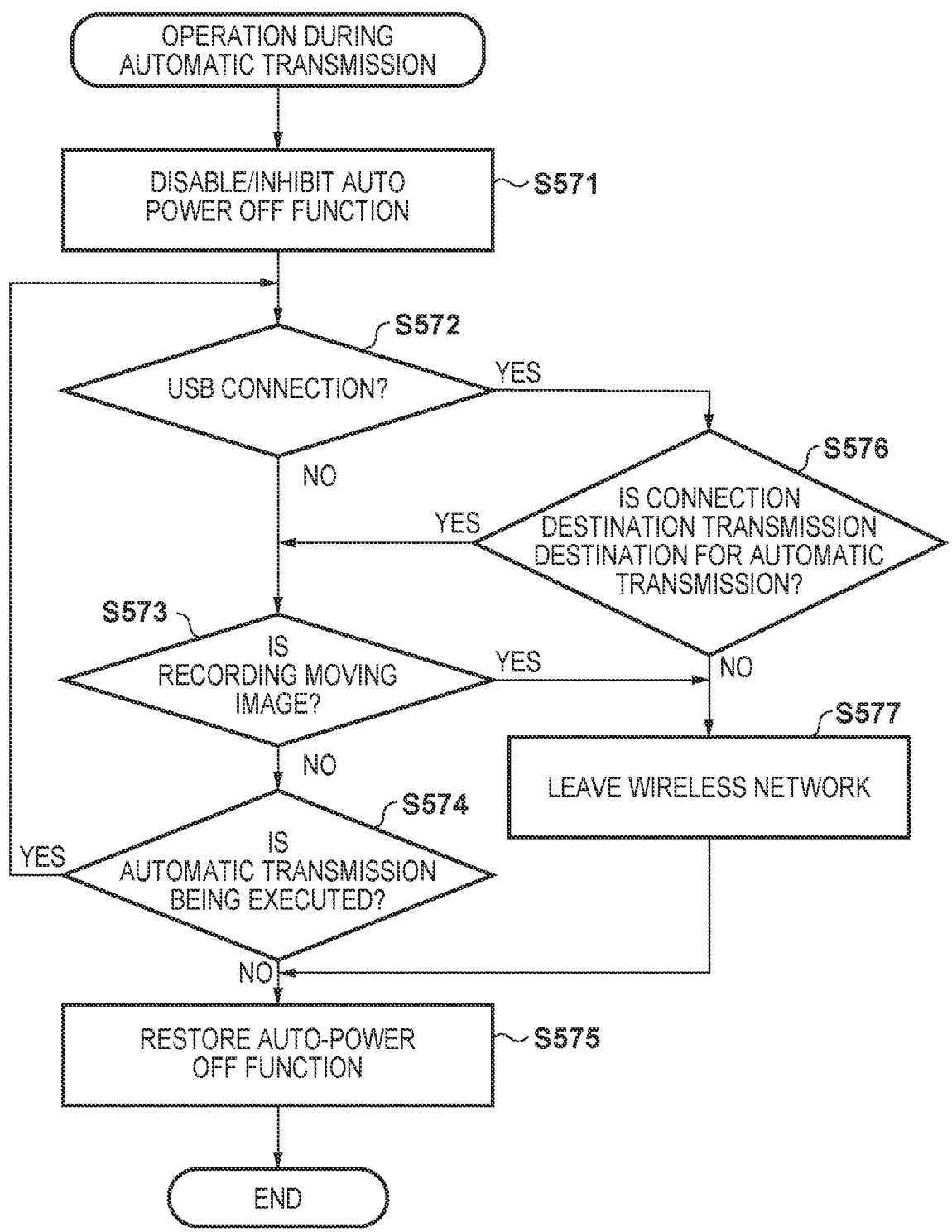
FIG. 5C is a flowchart illustrating an operation of the digital camera during the automatic transmission.

Note that, during execution of the automatic transmission, the control unit 101 performs processing as shown in FIG. 5C. If the function (auto-power off function) is enabled in which the digital camera 100 is automatically shut-down when no operation is performed in a predetermined time period, the image transmission will be stopped midway if no user operation is performed. Accordingly, in step S571, the control unit 101 disables and inhibits the auto-power off function.

Furthermore, if the user tries to execute a function that is incompatible with the automatic image transmission, the control unit 101 controls the digital camera 100 to leave the wireless LAN network (disconnects the communication connection to the PC 200), and ends the automatic transmission. For example, if image transmission using a USB connection and image transmission using a wireless LAN network connection are incompatible with each other, the control unit 101 leaves the wireless LAN network established for the automatic transmission when a USB connection is started. Note however that a configuration is also possible in which, if the connection destination of the USB connection is an external apparatus (PC200) to which an image is to be transmitted in automatic transmission, the automatic transmission is maintained.

The above-described processing is shown in steps S572 and S576 in FIG. 5C. In step S572, the control unit 101 determines whether or not a USB connection has been made. If it is determined that a USB connection has been made, the control unit 101 determines, in step S576, whether or not the USB connection destination is the transmission destination for the automatic transmission. If it is determined that the USB connection destination is the transmission destination for the automatic transmission (YES in step S576), the procedure moves to step S573. On the other hand, if it is determined that the USB connection destination is not the transmission destination for the automatic transmission (NO in step S576), the procedure moves to step S577. In step S577, the control unit 101 controls the digital camera 100 to leave the wireless network established for the automatic transmission (disconnects the communication connection to the PC 200).

Furthermore, if image transmission processing and moving image shooting processing are incompatible with each other, and a user has started shooting a moving image, the control unit 101 leaves the wireless LAN network established for the automatic transmission. That is, in step S573, the control unit 101 determines whether or not the digital camera 100 is recording the moving image. If it is determined that the moving image is being recorded (YES in step S573), the control unit 101 controls, in step S577, the digital camera 100 to leave the wireless network established for the automatic transmission. If it is determined that the moving image is not being recorded (NO in step S573), the procedure moves to step S574.

The control unit 101 repeatedly performs the above-described determination in steps S572 to S573 while the automatic transmission is executed (YES in step S574). If the automatic transmission is not being executed due to completion of the automatic image transmission (NO in step S574), the procedure moves to step S575. In step S575, the control unit 101 restores the auto-power off function (the state of the auto-power off function returns to the state before execution of step S571), and ends this procedure.

As described above, according to the present embodiment, it is possible to provide an image capturing apparatus that starts automatic image transmission based on an activation factor.

The present invention has been described in detail based on the preferred embodiment thereof, but the present invention is not limited to the specific embodiment, and the present invention encompasses various aspects without departing from the spirit of the invention. Also, in the above-described embodiment, a description has been given on the assumption that an object to be transmitted is an image, but the present invention is not necessarily limited to this. For example, any file such as a sound file or a text file may be used as long as it can be exchanged between a client device and a server device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-250105, filed Dec. 26, 2017, which is hereby incorporated by reference herein in its entirety.

What is claimed is:

1. A communication apparatus comprising:
a communication interface configured to communicate with an external apparatus;
a memory configured to store connection information for communication-connecting to the external apparatus via the communication interface;
a data transmitter configured to establish, in response to the communication apparatus being activated from a power-off state, communication connection to the external apparatus via the communication interface based on the connection information and automatically transmit data of the communication apparatus to the external apparatus; and
a controller configured to inhibit the data transmitter from automatically transmitting the data to the external apparatus, based on an activation factor, which is a factor of activating the communication apparatus from the power-off state.

2. The apparatus according to claim 1, wherein
the connection information includes identification information for uniquely identifying an access point and an external apparatus, and
the data transmitter connects, upon the activation, the communication interface to the external apparatus via the access point based on the identification information.

3. The apparatus according to claim 2, wherein
the data transmitter connects to the access point based on the connection information, and, after connecting to the access point, searches for the external apparatus and connects the communication interface to the external apparatus.

4. The apparatus according to claim 1, wherein
the controller inhibits the data transmitter from establishing the communication connection if the activation factor relates to activation such that, after activation, the communication apparatus performs certain processing and shuts down.

5. The apparatus according to claim 4, wherein
the controller inhibits the data transmitter from establishing the communication connection if the activation factor relates to activation in an operation in which activation and shut-down are automatically repeated.

6. The apparatus according to claim 1, wherein
the controller inhibits the data transmitter from establishing the communication connection if the activation factor relates to communication with a device different from the external apparatus.

7. The apparatus according to claim 1, wherein
the controller inhibits the data transmitter from establishing the communication connection if the activation factor relates to activation due to connection by another communication interface different from that communication interface.

8. The apparatus according to claim 7, wherein
the other communication interface performs short range wireless communication or close proximity wireless communication.

9. The apparatus according to claim 8, wherein
the short range wireless communication is Bluetooth or Bluetooth Low Energy.

10. The apparatus according to claim 8, wherein
the close proximity wireless communication is NFC.

11. The apparatus according to claim 1, wherein
the controller inhibits the data transmitter from establishing the communication connection if there is no data to be transmitted to the external apparatus.

12. The apparatus according to claim 1, wherein
the controller disconnects the communication connection if the activation factor relates to establishment of communication connection that is incompatible with the communication connection established by the data transmitter.

13. The apparatus according to claim 1, wherein
the controller disconnects the communication connection upon execution of moving image recording by image capture unit.

14. The apparatus according to claim 1,
wherein
the controller disables a function of automatically disconnecting a power supply of the communication apparatus during the data transmission executed by the data transmitter.

15. The apparatus according to claim 1, further comprising an image capture unit,
wherein the data transmitted by the data transmitter is image data obtained through shooting executed by the image capture unit.

16. A method for controlling a communication apparatus that includes a communication interface configured to communicate with an external apparatus, the method comprising:
storing, in a memory, connection information for communication-connecting to the external apparatus via the communication interface;
establishing, in response to the communication apparatus being activated from a power-off state, communication connection to the external apparatus via the communication interface based on the connection information and automatically transmitting data to the communication apparatus the external apparatus; and
inhibiting the automatically transmitting data of the communication apparatus to the external apparatus, based on an activation factor, which is a factor of activating the communication apparatus from the power-off state.

17. A communication apparatus comprising:
an image capture unit;
a communication interface configured to communicate with an external apparatus;
a memory configured to store image data obtained by the image capture unit; and
a controller configured to establish, in response to the communication apparatus being activated from a power-off state, communication connection to the external apparatus registered in advance, and automatically transmit the image data stored in the memory to the external apparatus,
wherein the controller inhibits automatic transmission of the image data is not executed if a factor of activating the communication apparatus from the power-off state is a predetermined factor.

18. The communication apparatus according to claim 17, wherein
the memory stores transmission history of the image data, and the controller decides that, of the image data stored in the memory, un-transmitted image data is data to be transmitted automatically based on the transmission history.

19. The communication apparatus according to claim 18, wherein
when all pieces of the un-transmitted image data have been transmitted, the controller ends the automatic transmission and disconnects the communication connection to the external apparatus.

20. A method for controlling a communication apparatus that includes an image capture unit, a communication interface configured to communicate with an external apparatus, and a memory configured to store image data obtained by the image capture unit, the method comprising:
establishing, in response to the communication apparatus being activated from a power-off state, communication connection to the external apparatus registered in advance, and automatically transmitting the image data stored in the memory to the external apparatus; and
inhibiting automatic transmission of the image data if a factor in of activating the communication apparatus from the power-off state is a predetermined factor.

21. A non-transitory computer readable storage medium storing a program for causing a computer to perform a method for controlling a communication apparatus that includes a communication interface configured to communicate with an external apparatus, the method comprising:
storing, in a memory, connection information for communication-connecting to the external apparatus via the communication interface;
establishing, in response to the communication apparatus being activated from a power-off state, communication connection to the external apparatus based on the connection information and automatically transmitting data of the communication apparatus to the external apparatus; and
inhibiting the automatically transmitting data of the communication apparatus to the external apparatus, based on an activation factor, which is a factor of activating the communication apparatus from the power-off state.

22. A non-transitory computer readable storage medium storing a program for causing a computer to perform a method for controlling a communication apparatus that includes an image capture unit, a communication interface configured do communicate with an external apparatus, and a memory configured to store image data obtained by the image capture unit, the method comprising:
establishing, in response to the communication apparatus being activated from a power-off state, communication connection to the external apparatus registered in advance, and automatically transmitting the image data stored in the memory to the external apparatus; and
inhibiting automatic transmission of the image data if a factor of activating the communication apparatus from the power-off state is a predetermined factor.

* * * * *